United States Patent
Kaufman

(10) Patent No.: US 8,288,686 B2
(45) Date of Patent: Oct. 16, 2012

(54) WELDING SYSTEMS AND METHODS FOR CONTROLLING A WIRE FEEDER VIA A SPOOL GUN CONNECTION

(75) Inventor: Charles Lyle Kaufman, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 393 days.

(21) Appl. No.: 12/727,392

(22) Filed: Mar. 19, 2010

(65) Prior Publication Data

US 2010/0314369 A1 Dec. 16, 2010

Related U.S. Application Data

(60) Provisional application No. 61/186,213, filed on Jun. 11, 2009.

(51) Int. Cl.
*B23K 9/10* (2006.01)
(52) U.S. Cl. .............. 219/130.1; 219/136; 219/137 PS
(58) Field of Classification Search .............. 219/130.1, 219/130.21, 130.31, 130.32, 136, 137.31, 219/137.7, 137.71, 137.8, 137.9, 138, 137 PS
See application file for complete search history.

(56) References Cited

U.S. PATENT DOCUMENTS

| | | | |
|---|---|---|---|
| 4,147,919 A | 4/1979 | Matasovic | |
| 4,508,954 A | 4/1985 | Kroll | |
| 6,066,832 A * | 5/2000 | Uecker et al. | 219/136 |
| 6,705,563 B2 | 3/2004 | Luo et al. | |
| 6,906,285 B2 | 6/2005 | Zucker et al. | |
| 7,041,937 B2 | 5/2006 | Ihde et al. | |
| 7,098,425 B2 | 8/2006 | Meckler | |
| 7,884,304 B2 * | 2/2011 | Brietbach | 219/133 |
| 2008/0011730 A1 | 1/2008 | Enyedy et al. | |
| 2010/0301029 A1* | 12/2010 | Meckler et al. | 219/130.1 |

FOREIGN PATENT DOCUMENTS

| | | |
|---|---|---|
| EP | 1 586 403 A1 | 10/2005 |
| WO | 2007100480 A2 | 9/2007 |

OTHER PUBLICATIONS

International Search Report for application No. PCT/US2010/033975 mailed Aug. 24, 2010.

* cited by examiner

*Primary Examiner* — Tan T. Nguyen
(74) *Attorney, Agent, or Firm* — Fletcher Yoder, P.C.

(57) ABSTRACT

A welding system including a welding power supply coupled to a wire feeder via a spool gun connection is provided. The welding system is adapted to utilize the power and control capabilities originating from the spool gun connection for wire feeder operations during an initial period. The wire feeder is adapted to utilize the welding arc power and an internal controller to power and control wire feeder operations after the initial period.

20 Claims, 4 Drawing Sheets

WELDING SYSTEMS AND METHODS FOR CONTROLLING A WIRE FEEDER VIA A SPOOL GUN CONNECTION

CROSS REFERENCE TO RELATED APPLICATIONS

This application is a Non-Provisional Patent Application of U.S. Provisional Patent Application No. 61/186,213, entitled "External Feeder Controlled as a Spool Gun", filed Jun. 11, 2009, which is herein incorporated by reference.

BACKGROUND

The invention relates generally to welding systems, and, more particularly, to a hybrid wire feeder for use in a welding system.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeder to ensure a proper wire feed reaches a welding torch.

Oftentimes, such wire feeders rely on the welding power supply output to power wire feeder operations, such as wire jogs, gas purges, display power, and so forth. Accordingly, these welding systems rely on an electrical contactor in the wire feeder to control the starting and stopping of the welding process. Unfortunately, such an arrangement requires the welding power supply to remain active during non-welding periods (e.g., standby periods, periods prior to weld initiation, etc.) to ensure the power demands of the wire feeder are met. For example, the power supply must supply the wire feeder with control power that enables the wire feeder to power and control wire feeder operations before, during, and after a welding operation. Such features limit the efficiency and utility of traditional wire feeders. Accordingly, there exists a need for welding systems that overcome these drawbacks.

BRIEF DESCRIPTION

In an exemplary embodiment, a welding system includes a welding power supply including a weld connection and a control connection, wherein the welding power supply is adapted to provide welding power through the weld connection and to provide control power and control data through the control connection. The welding system also includes a wire feeder including a controller. The wire feeder is adapted to utilize the control power and control data from the welding power supply to power and control weld sequencing events while the welding power supply is not providing welding power. The wire feeder is further adapted to utilize the welding power to power weld sequencing events and the controller to control weld sequencing events while the welding power supply is providing welding power.

In another exemplary embodiment, a controller for a welding system is adapted to provide energy from a spool gun connection of a welding power source to a wire feeder to power one or more wire feeder operations while a welding power supply is not providing weld power. The controller is further adapted to provide control data from the spool gun connection of the welding power source to the wire feeder to control the one or more wire feeder operations while a welding power supply is not providing power. Still further, the controller is also adapted to utilize weld power from the welding power source to power the one or more wire feeder operations and to utilize a control circuit disposed in the wire feeder to control the one or more wire feeder operations while the welding power supply is providing weld power.

In another exemplary embodiment, a welding system includes a welding power supply including a spool gun connection. The welding power supply is adapted to provide control power and control data through the spool gun connection. The welding system also includes a wire feeder including a control circuit. The wire feeder is adapted to receive the control power and control data from the welding power supply and to utilize the control power and the control data to execute a wire feeder operation prior to initialization of the control circuit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments are provided of a welding system including a welding power supply coupled to a wire feeder via control power and control data connection. The connection may be one that is ordinarily or otherwise designated and provided for a spool gun. As will be appreciated by those skilled in the art, such spool guns are lightweight devices that hold a limited quantity of welding wire on or adjacent to a welding torch, and that are powered and controlled by signals from a power and data connection on a welding power supply. These connections are typically dedicated so such devices and may not be used at all unless a spool gun is connected to the system. The embodiments described below may use such connections in an altogether novel manner to power and/or control operations of a wire feeder that would not otherwise be possible due to an absence of welding power normally used to power such operations. However, throughout the present discussion, it should be borne in mind that, while reference is made to a "spool gun connection", any similar connection may be used for the purposes disclosed, and this designation is intended as exemplary only, and for convenient reference.

The welding system is adapted to utilize the power and control capabilities originating from the spool gun connection for weld sequencing events during an initial period. That is, the wire feeder is configured to utilize the spool gun control connection from the power supply as a source of control power during an initial period. The wire feeder is further adapted to utilize the welding arc power and an internal controller to power and control weld sequencing events after the initial period. In this way, presently contemplated embodiments provide for an initial wire movement and/or gas activity to be controlled and powered via the spool gun connection before the wire feeder takes over control of the gas and motor controls with power from the welding arc power. The foregoing features may have the effect of reducing or eliminating the need for the power source to output welding power prior to initiation of the welding arc since the wire feeder operations may be powered and controlled by the spool gun connection, thus eliminating the need for the wire feeder to utilize an electrical contactor to start and stop the welding process.

Figure 1:
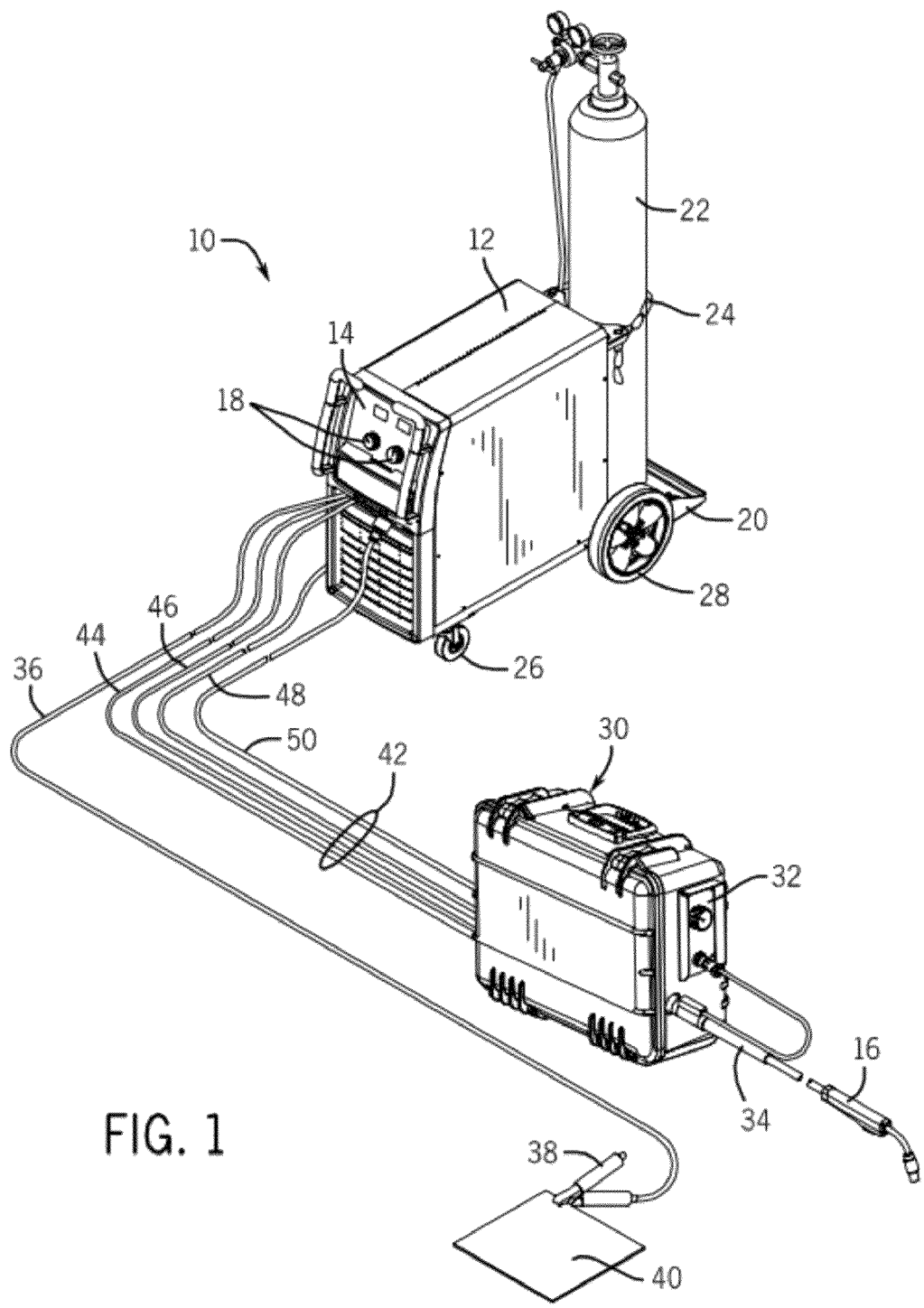
FIG. 1 is a perspective view of an exemplary welding power supply coupled to a wire feeder via a control power and control data connection, which may be a spool gun connection, in accordance with aspects of the present invention.

Turning now to the drawings, FIG. 1 illustrates an exemplary welding system 10 which powers, controls, and provides supplies to a welding operation. The welding system 10 includes a welder 12 having a control panel 14 through which a welding operator may control the supply of welding materials, such as gas flow, wire feed, and so forth, to a welding torch 16. To that end, the control panel 14 includes knobs 18 that the operator may use to adjust welding parameters (e.g., voltage, current, etc.). The welder 12 may also include a tray 20 mounted on a back of the welder 12 and configured to support a gas cylinder 22 held in place with a chain 24. The gas cylinder 22 is the source of the gas that supplies the welding torch 16. Furthermore, the welder 12 may be portable via a set of smaller front wheels 26 and a set of larger back wheels 28, which enable the operator to move the welder 12 to the location of the weld.

The welding system 10 also includes a wire feeder 30 that provides welding wire to the welding torch 16 for use in the welding operation. The wire feeder 30 may include a control panel 32 that allows the user to set one or more wire feed parameters, such as wire feed speed. Additionally, the wire feeder 30 may house a variety of internal components, such as a wire spool, a wire feed drive system, a motor, and so forth. In presently contemplated embodiments, the wire feeder 30 may also obtain power for wire feeder operations from the welding arc power supplied by the power supply 12. Additionally, the wire feeder 30 may be adapted to connect to a spool gun connection on the welder 12 such that initial sequencing of gas flow and wire feed may be controlled by the spool gun connection and not an electrical contactor as in traditional systems. That is, as described in detail below, the spool gun connection provides initial control over weld sequencing events before the wire feeder controls are activated. Once an initialization period has elapsed, the gas flow and wire feed may be fully controlled by the wire feeder controller and the welding arc power may provide power for subsequent gas flow and wire feed operations. Additionally, it should be noted that the wire feeder 30 may be used with any wire feeding process, such as gas operations (gas metal arc welding (GMAW)) or gasless operations (shielded metal arc welding (SMAW)). For example, the wire feeder may be used in metal inert gas (MIG) welding.

A variety of cables couple the components of the welding system 10 together and facilitate the supply of welding materials to the welding torch 16. A first cable 34 couples the welding torch 16 to the wire feeder 30. A second cable 36 couples the welder 12 to a work clamp 38 that connects to a workpiece 40 to complete the circuit between the welder 12 and the welding torch 16 during a welding operation. A bundle 42 of cables couples the welder 12 to the wire feeder 30 and provides weld materials for use in the welding operation. The bundle 42 includes a feeder power lead 44, a weld cable 46, a gas hose 48, and a control cable 50. Depending on the polarity of the welding process, the feeder power lead 44 connects to the same weld terminal as the cable 36. The control cable 50 may be the spool gun connection that provides control over initial weld sequencing events (gas flow and wire feed) prior to the initialization of the wire feeder controller.

It should be noted that the bundle 42 of cables may not be bundled together in some embodiments. Additionally, other modifications to the exemplary welding system 10 of FIG. 1 may be made in accordance with aspects of the present invention. For example, the tray 20 may be eliminated from the welder 12 and the gas cylinder 22 may be located on an auxiliary support cart or in a location remote from the welding operation. Furthermore, although the illustrated embodiments are described in the context of a constant voltage MIG welding process, the features of the invention may be utilized with a variety of other suitable welding systems and processes.

Figure 2:
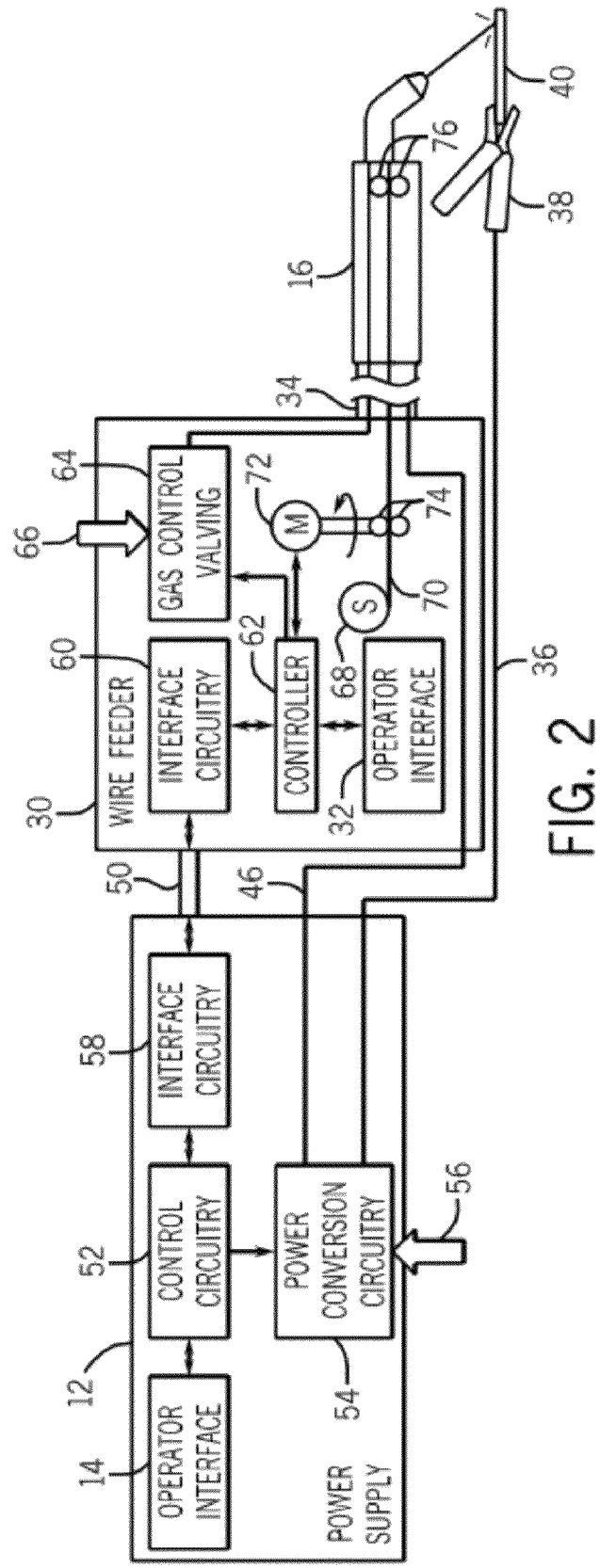
FIG. 2 is a block diagram illustrating exemplary internal components of the welding power supply and the wire feeder of FIG. 1 in accordance with aspects of the present invention.

FIG. 2 is a block diagram illustrating internal components of the power supply 12 and the wire feeder 30. The welder 12 and the wire feeder 30 are coupled to one another via the control cable 50 and the weld power cable 46, and the welding torch 16 is coupled to the wire feeder 30 via cable 34. In traditional systems where the system is adapted for use with a spool gun, the control cable 50 may enable the power supply 12 to be connected to a spool gun. However, in presently contemplated embodiments, the control cable 50 connects to the wire feeder 30 to enable the control and powering of initial weld sequencing events prior to the activation and powering of the wire feeder. That is, the control cable 50 may be a minor source of control power such that the initial sequencing of gas flow and wire feed are controlled and powered by the spool gun connection to the power supply. To that end, embodiments of the present invention may include low power gas valving. After the initial weld sequencing events occur and the power supply and the wire feeder are fully activated, the spool gun connection no longer controls or powers the weld sequencing events. Instead, the wire feeder resumes control of the welding operation and the weld arc power is utilized as the power source for the wire feeder operations.

As illustrated, the welder 12 includes the operator interface 14 that allows for data settings to be selected by the operator. The operator interface 14 may allow for selection of settings such as the weld process, the type of wire to be used, voltage and current settings, and so forth. In particular, the system is designed to allow for MIG welding with aluminum or other welding wire that is pushed towards the torch 16. These weld settings are communicated to control circuitry 52 within the power supply 12.

The control circuitry 52 operates to control generation of welding power output that is applied to the welding wire for carrying out the desired welding operation. The control circuitry 52 is coupled to power conversion circuitry 54. This power conversion circuitry 54 is adapted to create the output power that will ultimately be applied to the welding wire at the torch 16. Various power conversion circuits may be employed, including choppers, boost circuitry, buck circuitry, inverters, converters, and so forth. The configuration of such circuitry may be of types generally known in the art. The power conversion circuitry 54 is coupled to a source of electrical power as indicated by arrow 56. The power applied to the power conversion circuitry 54 may originate in the power grid, although other sources of power may also be used, such as power generated by an engine-driven generator, batteries, fuel cells or other alternative sources. Finally, the welder 12 illustrated in FIG. 2 includes interface circuitry 58 designed to allow the control circuitry 52 to exchange signals with the wire feeder 30.

The wire feeder 30 also includes interface circuitry 60 that is coupled to the interface circuitry 58 in the power supply 12. In some embodiments, multi-pin interfaces may be provided on both components and a multi-conductor cable run between the interface circuitry to allow for such information as wire feed speeds, processes, selected currents, voltages or power levels, and so forth to be set on either the power supply 12, the wire feeder 30, or both.

The wire feeder 12 also includes a controller 62 coupled to the interface circuitry 60. The controller 62 allows for wire feed speeds to be controlled in accordance with operator selections, and permits these settings to be fed back to the power supply 12 via the interface circuitry 60. The controller 62 is further coupled to the operator interface 32 on the wire feeder 30 that allows selection of one or more welding parameters, particularly wire feed speed. The operator interface 32 may also allow for selection of such weld parameters as the process, the type of wire utilized, current, voltage or power settings, and so forth. The controller 62 is also coupled to gas control valving 64, which regulates the flow of shielding gas to the torch 16. In some embodiments, the gas control valving 64 may be low power gas valving that is adapted to utilize low amounts of energy to power its operations. In general, such gas is provided at the time of welding from a source 66, and may be turned on immediately preceding the weld and for a short time following the weld.

The wire feeder 30 also includes components for feeding wire to the welding torch 16 and thereby to the welding application, under the control of the controller 62. For example, one or more spools 68 of welding wire 70 are housed in the wire feeder 30. Welding wire 70 is unspooled from the spools 68 and is progressively fed to the torch 16. A feed motor 72 is provided that engages with feed rollers 74 to push wire from the wire feeder towards the torch. In practice, one of the rollers 74 is mechanically coupled to the motor 72 and is rotated by the motor to drive the wire from the wire feeder, while the mating roller is biased towards the wire to maintain good contact between the two rollers and the wire. Some systems may include multiple rollers of this type.

Power from the power supply 12 is applied to the wire, typically by means of the welding cable 46, in a conventional manner. Similarly, shielding gas is fed through the wire feeder and the welding cable. During welding operations, the wire is advanced through the welding cable jacket towards the torch 16. The motor is regulated to provide the desired wire feed speed. A trigger switch on the torch completes a signal that is fed back to the wire feeder and there from back to the power supply to enable the welding process to be started and stopped by the operator. That is, upon depression of the trigger switch, gas flow is begun, wire is advanced, power is applied to the welding cable 46 and through the torch to the advancing welding wire.

Figure 3:
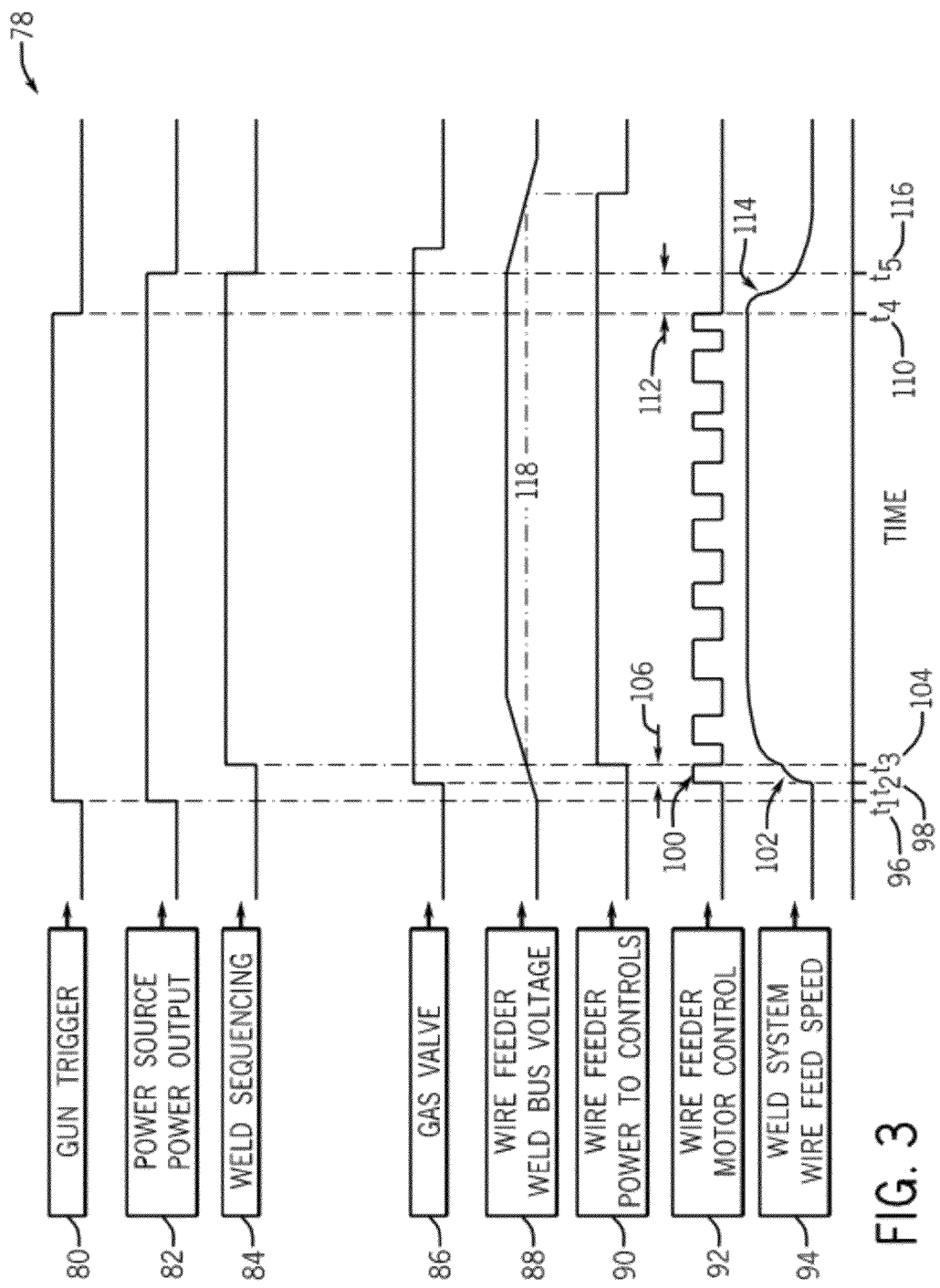
FIG. 3 is an exemplary timing diagram that for operations that may be performed during operation of an embodiment of the wire feeder and the power supply of FIG. 1.

FIG. 3 illustrates an exemplary timing diagram 78 that may be generated during operation of an embodiment of the welding system of FIG. 1. As such, the timing diagram 78 includes a gun trigger plot 80, a power source power output plot 82, a weld sequencing plot 84, a gas valve plot 86, a wire feeder weld bus voltage plot 88, a wire feeder power to controls plot 90, a wire feeder motor control plot 92, and a wire feed speed plot 94. Together, the plots illustrate the timing of various functions and events as the spool gun connection and the welding arc power are selectively utilized to power and control the weld sequencing events.

As shown, at a first time 96, the gun trigger is depressed, as shown in the gun trigger plot 80, and the power source power output is initiated, as shown in the power output plot 82. Concurrently, when the gun trigger is pulled at time 96, the power supply initiates a steady increase in the weld bus voltage, as shown in the bus voltage plot 88. Such a voltage increase may be supplied to the wire feeder via the 10-pin control cable (i.e., the spool gun connection) and utilized by the wire feeder to power one or more initial weld sequencing operations. At a second time 98, the wire feeder motor control initiates an initial wire movement, as shown by arrow 100 in plot 92 and arrow 102 in plot 94 and initial gas valve activation in plot 86. This initial wire movement and gas valve activation is controlled via the control cable (i.e., the spool gun connection) since the wire feeder controls have not yet been activated.

At a third time 104, weld sequencing begins, as shown in plot 84. Also, power from the power supply is supplied to the wire feeder controls at time 104, as shown in plot 90. Accordingly, the spool gun connection no longer controls or powers subsequent wire feeder operations; such functions are taken over by the wire feeder controls. That is, prior to time 104, the control cable connection (i.e., the spool gun connection) is utilized to control and power the initial wire feeder operations (e.g., initial wire movement). However, after time 104, the weld bus voltage has reached a level sufficient for the wire feeder controls to take over operation and the power supply welding arc power may be used to power subsequent wire feeder operations. A wake-up period 106 elapses between time 98 and time 104 after which the wire feeder controls become fully activated.

At a fourth time 110, the gun trigger is released, as shown in plot 80, initiating a burn back period 112. During the burn back period 112, the power supply remains active to prevent the wire from being shorted in the weld, as shown in plot 82. Accordingly, the beginning of the burn back period at time 110 begins a period 114 during which the wire feed speed is decreased. The burn back period 112 ends at a fifth time 116, at which the power supply no longer outputs welding power and the weld sequencing ends. At the fifth time 116, the weld bus voltage begins to decrease. When the weld bus voltage has reached the minimum feeder operating voltage 118, the wire feeder controls are deactivated, as shown in plot 90.

Figure 4:
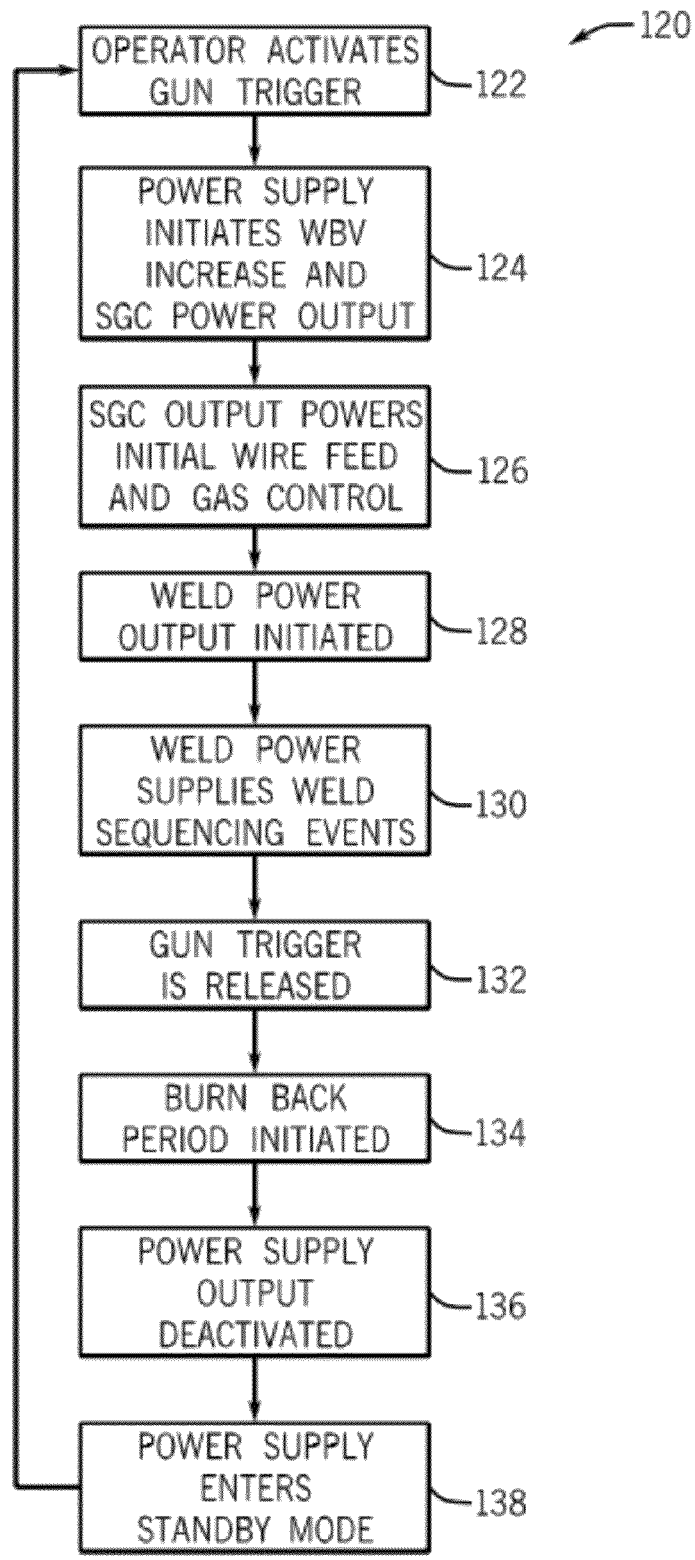
FIG. 4 is a flow chart illustrating an exemplary method of operating a wire feeder coupled to a welding power supply via a control power and control data connection in accordance with aspects of the present invention.

FIG. 4 is a flow chart 120 illustrating steps associated with one exemplary mode of operation of the welding system of FIG. 1. The flow chart begins when an operator activates a trigger on a welding torch (block 122). Activation of the gun trigger leads to the power supply initiating spool gun connection power output and weld bus voltage increase (block 124). The spool gun connection power output may then be used to power the initial wire feed and gas control (block 126). Subsequently, the welding arc power is output by the welding power supply (block 128) and such power is used to supply one or more weld sequencing events (block 130). For example, while the weld bus voltage may supply minimal power to enable an initial wire movement, the welding arc power may be utilized to sustain such movement throughout the welding process.

When an operator releases the gun trigger (block 132), the burn back period is initiated (block 134). During the burn back period, the welding power supply continues to output power while the weld sequencing events are terminated. At the end of the burn back period, the power supply output is deactivated (block 136), and the power supply enters standby mode (block 138). The power supply remains in standby mode until the operator activates the trigger again (block 122).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
    a welding power supply comprising a weld connection and a control connection, wherein the welding power supply is configured to provide welding power through the weld connection and to provide control power and control data through the control connection; and
    a wire feeder comprising a controller, wherein the wire feeder is configured to utilize the control power and control data from the welding power supply to power and control wire feeder operations while the welding power supply is not providing welding power, and wherein the wire feeder is further configured to utilize the welding power to power wire feeder operations and the controller to control wire feeder operations while the welding power supply is providing welding power.

2. The welding system of claim 1, wherein the wire feeder operations comprise at least one of a wire jog, a wire feed, and a gas purge.

3. The welding system of claim 1, wherein the wire feeder comprises low power gas control valving configured to regulate the flow of gas to a welding torch while utilizing a reduced amount of energy.

4. The welding system of claim 1, comprising a gas conduit configured to transport gas from a gas cylinder to gas valving located in the wire feeder.

5. The welding system of claim 1, comprising a control cable that couples the control connection of the welding power supply to the wire feeder and a weld cable that couples the weld connection to the wire feeder.

6. The welding system of claim 5, wherein the control cable and the weld cable are bundled together in a single conduit that couples the welding power supply to the wire feeder.

7. The welding system of claim 1, wherein the welding power supply comprises first interface circuitry and the wire feeder comprises second interface circuitry and the first interface circuitry and the second interface circuitry are configured to bidirectionally exchange information regarding the welding operation.

8. A controller for a welding system configured to:
    provide energy from a spool gun connection of a welding power source to a wire feeder to power one or more wire feeder operations while a welding power supply is not providing weld power;
    provide control data from the spool gun connection of the welding power source to the wire feeder to control the one or more wire feeder operations while a welding power supply is not providing power; and
    utilize weld power from the welding power source to power the one or more wire feeder operations and utilize a control circuit disposed in the wire feeder to control the one or more wire feeder operations while the welding power supply is providing weld power.

9. The controller of claim 8, configured to initiate a burn back period during which the welding power source is configured to supply weld power to power the wire feeder operations.

10. The controller of claim 8, wherein the one or more wire feeder operations comprises at least one of a wire jog, a wire feed, and a gas purge.

11. The controller of claim 8, wherein the spool gun connection is a 10-pin connection configured to engage a control cable.

12. The controller of claim 11, wherein the control cable is configured to deliver control power and control data from the power source to the wire feeder.

13. The controller of claim 8, configured to facilitate a bidirectional exchange of information between first interface circuitry located in the welding power supply and second interface circuitry located in the wire feeder.

14. The controller of claim 8, configured to initiate a wakeup period in response to activation of a welding torch trigger, wherein the wire feeder motor control is initiated after the wakeup period.

15. A welding system, comprising:
    a welding power supply comprising a spool gun connection and being adapted to provide control power and control data through the spool gun connection; and
    a wire feeder comprising a control circuit, wherein the wire feeder is configured to receive the control power and control data from the welding power supply and to utilize the control power and the control data to execute a wire feeder operation prior to initialization of the control circuit.

16. The welding system of claim 15, wherein the welding power supply comprises a weld connection and is adapted to provide weld power through the weld connection.

17. The welding system of claim 16, wherein the wire feeder is configured to utilize the weld power to execute the wire feeder operation after initialization of the control circuit.

18. The welding system of claim 15, wherein the wire feeder operation is at least one of a wire jog, a wire feed, and a gas purge.

19. The welding system of claim 15, wherein the wire feeder comprises low power gas control valving configured to regulate the flow of gas to a welding torch with a low power output.

20. The welding system of claim 15, wherein the control circuit is configured to initiate a burn back period during which the welding power supply is configured to supply weld power to power the wire feeder operation.

* * * * *